H. C. KORFHAGE.
STUFFING BOX.
APPLICATION FILED MAY 25, 1914.
1,181,143.
Patented May 2, 1916.
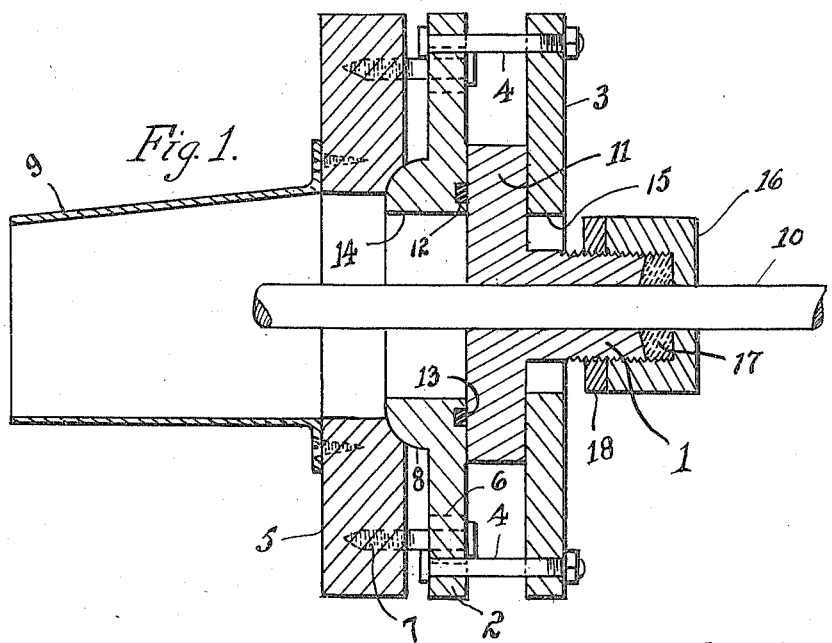
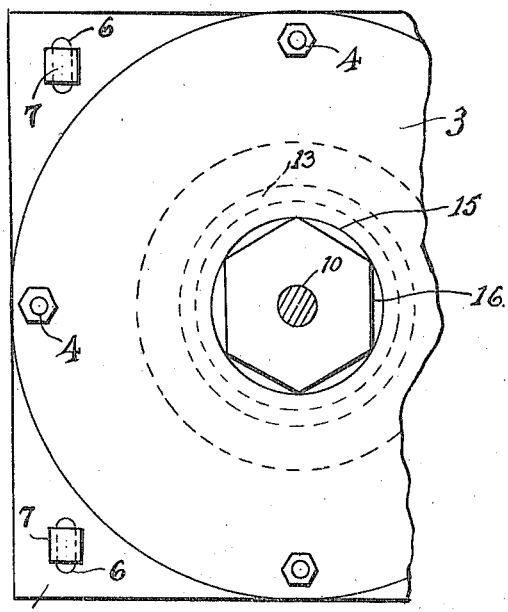
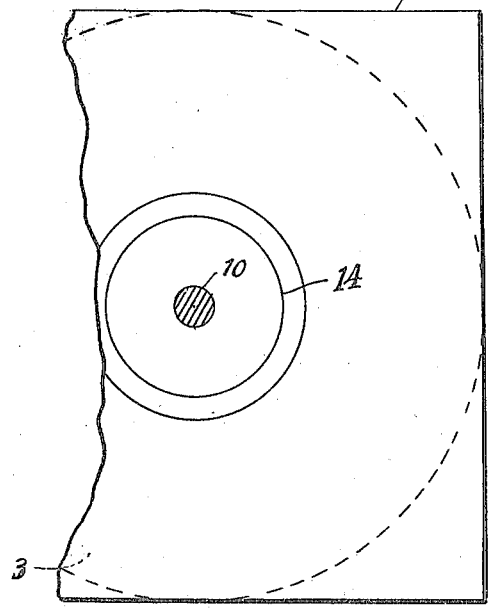
WITNESSES:
Harry W. Davis
A. L. Wickliffe
HERMAN C. KORFHAGE INVENTOR
BY
Bradford Webster ATTORNEY

UNITED STATES PATENT OFFICE.

HERMAN C. KORFHAGE, OF NEW ALBANY, INDIANA.

STUFFING-BOX.

1,181,143.
Specification of Letters Patent.
Patented May 2, 1916.

Application filed May 25, 1914. Serial No. 840,910.

*To all whom it may concern:*

Be it known that I, HERMAN C. KORFHAGE, a citizen of the United States, residing at New Albany, Floyd county, Indiana, have invented a new and useful Stuffing-Box, of which the following is a full, clear, and exact description.

My invention applies particularly to stuffing boxes used on propeller shafts, and has for its object to improve the adjustable properties of such stuffing boxes.

My invention consists of novel features and parts and combinations of the same, which will be more fully described hereinafter and then pointed out in the claims.

A practical embodiment of my invention is illustrated in the accompanying drawings, in which similar characters of reference indicate corresponding parts in all the views.

Figure 1 is a vertical longitudinal section; Fig. 2 is an end elevation looking toward the nut; and Fig. 3 is an end elevation from the other end.

The stuffing box 1 on the rod 10 is provided with a flange 11, which is held closely in position between the faces of the containing plates 2 and 3. The containing plates 2 and 3 are held in position relatively by the bolts 4. The plate 3 is provided with a central opening 15 large enough to allow the stuffing box 1 to move in any direction a substantial distance. This provides for displacement of a propeller shaft or other packed rod a substantial distance, where the direction of the axis of the rod or shaft is not changed.

The plate 2 is connected positively with the base plate or other solid base 5 by the lag screws 7 which pass through the oblong openings 6 in the plate 2. The plate 2 is provided with a ball surface 8 fitting into a corresponding surface 14 in the plate 5. By this structure positive axial adjustment is provided. If the upper screws 7 are tightened and the lower screws 7 loosened the axis of the stuffing box will be raised in the direction toward the engine. The axis of propeller shafts are often displaced upward or downward and this adjustment provides a simple and effective means for conforming the axis of the stuffing box with the axis of the shaft when so displaced.

To pack the outer face of the stuffing box 1, I provide preferably a packing ring 13 of soft material in a groove 12 in the plate 2. It is evident that various other arrangements of packing of a similar character could be used between the stuffing box 1 and the plate 2.

To complete the stuffing box I employ the nut 16, screwed over the stuffing box 1 and holding the packing 17 against the rod 10 and the end of the box 1. I provide the usual lock nut 18, screwed over the stuffing box 1, against the inner end of the nut 16.

To cover the outer end of the propeller shaft 10 I provide the usual covering consisting of the usual shield 9.

I do not limit myself further than is indicated in the claims which follow.

I claim:

1. The combination in a rod packing, of a pair of fixed plates, a stuffing box on the rod provided with a flange; said flange being positioned closely and movably between said plates; said plates being provided with openings adapted to admit substantial lateral movement of said rod and box; one of said plates being provided with a ball joint surface, adapted to admit of changes in the axes of the stuffing box to correspond with similar changes in the rod.

2. A rod packing comprising a solid base apertured at the center, said aperture on one side being shaped to form a spherically curved receiving socket, lag screws fixed in said base at diametrically opposite points, a centrally apertured plate provided with an annular convex ring to fit said receiving socket, said plate and base being universally jointed slots in said plate to receive said screws permitting by adjustment of the screws rocking movement of the plate, a second centrally apertured plate bolted to said first named plate in parallelism therewith, a stuffing box having a laterally extended annular flat flange for universal adjustment in the plane of the plates dependent upon the relative size of the stuffing box, its flange, and the apertures in said plates, a nonfriction packing ring between the first plate and said flange and suitable packing on the end of the stuffing box.

HERMAN C. KORFHAGE.

Witnesses:
LISETTE A. KORFHAGE,
A. L. WICKLIFFE.

Copies of this patent may be obtained for five cents each, by addressing the "Commissioner of Patents, Washington, D. C."